United States Patent
Sekine et al.

(10) Patent No.: US 11,685,411 B2
(45) Date of Patent: Jun. 27, 2023

(54) TRAVEL CONTROLLER AND METHOD FOR TRAVEL CONTROL

(71) Applicant: TOYOTA JIDOSHA KABUSHIKI KAISHA, Toyota (JP)

(72) Inventors: Kiyotoshi Sekine, Kakamigahara (JP); Masato Uehara, Tokyo-to (JP); Takashi Ota, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/459,435

(22) Filed: Aug. 27, 2021

(65) Prior Publication Data
US 2022/0063677 A1 Mar. 3, 2022

(30) Foreign Application Priority Data
Aug. 31, 2020 (JP) .................................. 2020-145945

(51) Int. Cl.
*G08B 23/00* (2006.01)
*B60W 60/00* (2020.01)
(Continued)

(52) U.S. Cl.
CPC ........ *B60W 60/0053* (2020.02); *B60W 40/08* (2013.01); *B60W 50/082* (2013.01);
(Continued)

(58) Field of Classification Search
CPC ............. B60W 60/0053; B60W 40/08; B60W 50/082; B60W 50/14; B60W 2040/0818; B60W 2050/0088; B60W 2050/143; B60W 2050/146; B60W 2540/10; B60W 2540/12; B60W 2540/223; B60W 2540/225;
(Continued)

(56) References Cited

U.S. PATENT DOCUMENTS 10,493,997 B2 * 12/2019 Kim ...................... G05D 1/0061
10,935,974 B1 *  3/2021 Fields ................... B60W 50/14
(Continued)

FOREIGN PATENT DOCUMENTS

DE  10 2017 007 155 A1  1/2019
EP   2 848 488 A1        3/2015
(Continued)

*Primary Examiner* — Anh V La
(74) *Attorney, Agent, or Firm* — Sughrue Mion, PLLC

(57) ABSTRACT

A travel controller performs driving control of a vehicle at an autonomous driving level that is a first autonomous driving level in which a driver of the vehicle is not obligated to watch or a second autonomous driving level in which the driver is obligated to watch; notifies, for a predetermined period, the driver of a request for driving the vehicle or taking a driving posture allowing for the driving, when the autonomous driving level of the driving control changes from the first autonomous driving level to the second autonomous driving level; and determines an attention level of the driver, based on an output of a sensor provided for the vehicle. The attention level is a level of attention to driving. The travel controller further modifies the predetermined period so as to be shorter when the determined attention level is high than when the attention level is low.

10 Claims, 4 Drawing Sheets

(51) Int. Cl.
*G06V 20/59* (2022.01)
*G06V 40/16* (2022.01)
*B60W 40/08* (2012.01)
*B60W 50/08* (2020.01)
*B60W 50/14* (2020.01)
*B60W 50/00* (2006.01)

(52) U.S. Cl.
CPC ........... *B60W 50/14* (2013.01); *G06V 20/597* (2022.01); *G06V 40/161* (2022.01); *B60W 2040/0818* (2013.01); *B60W 2050/0088* (2013.01); *B60W 2050/143* (2013.01); *B60W 2050/146* (2013.01); *B60W 2540/10* (2013.01); *B60W 2540/12* (2013.01); *B60W 2540/223* (2020.02); *B60W 2540/225* (2020.02); *B60W 2540/229* (2020.02)

(58) Field of Classification Search
CPC ... B60W 2540/229; B60W 2050/0072; B60W 2420/42; B60W 60/0057; B60W 60/005; G06V 20/597; G06V 40/161
USPC ....................... 340/576, 575, 457, 425.5, 439
See application file for complete search history.

(56) References Cited

U.S. PATENT DOCUMENTS

| | | | |
|---|---|---|---|
| 2015/0070160 A1* | 3/2015 | Davidsson | B60K 28/06 340/457 |
| 2016/0041553 A1 | 2/2016 | Sato et al. | |
| 2017/0315556 A1 | 11/2017 | Mimura et al. | |
| 2019/0184998 A1* | 6/2019 | Zheng | B60W 40/09 |
| 2019/0202471 A1* | 7/2019 | Hashimoto | B60W 50/085 |
| 2019/0278267 A1 | 9/2019 | Honda | |
| 2021/0370983 A1 | 12/2021 | Oba | |

FOREIGN PATENT DOCUMENTS

| | | |
|---|---|---|
| EP | 2 982 565 A2 | 2/2016 |
| JP | 2016-038768 A | 3/2016 |
| JP | 2017-204301 A | 11/2017 |
| JP | 2018-030425 A | 3/2018 |
| JP | 2019-155956 A | 9/2019 |
| WO | 2019/017215 A1 | 1/2019 |
| WO | 2019202881 A1 | 10/2019 |

* cited by examiner

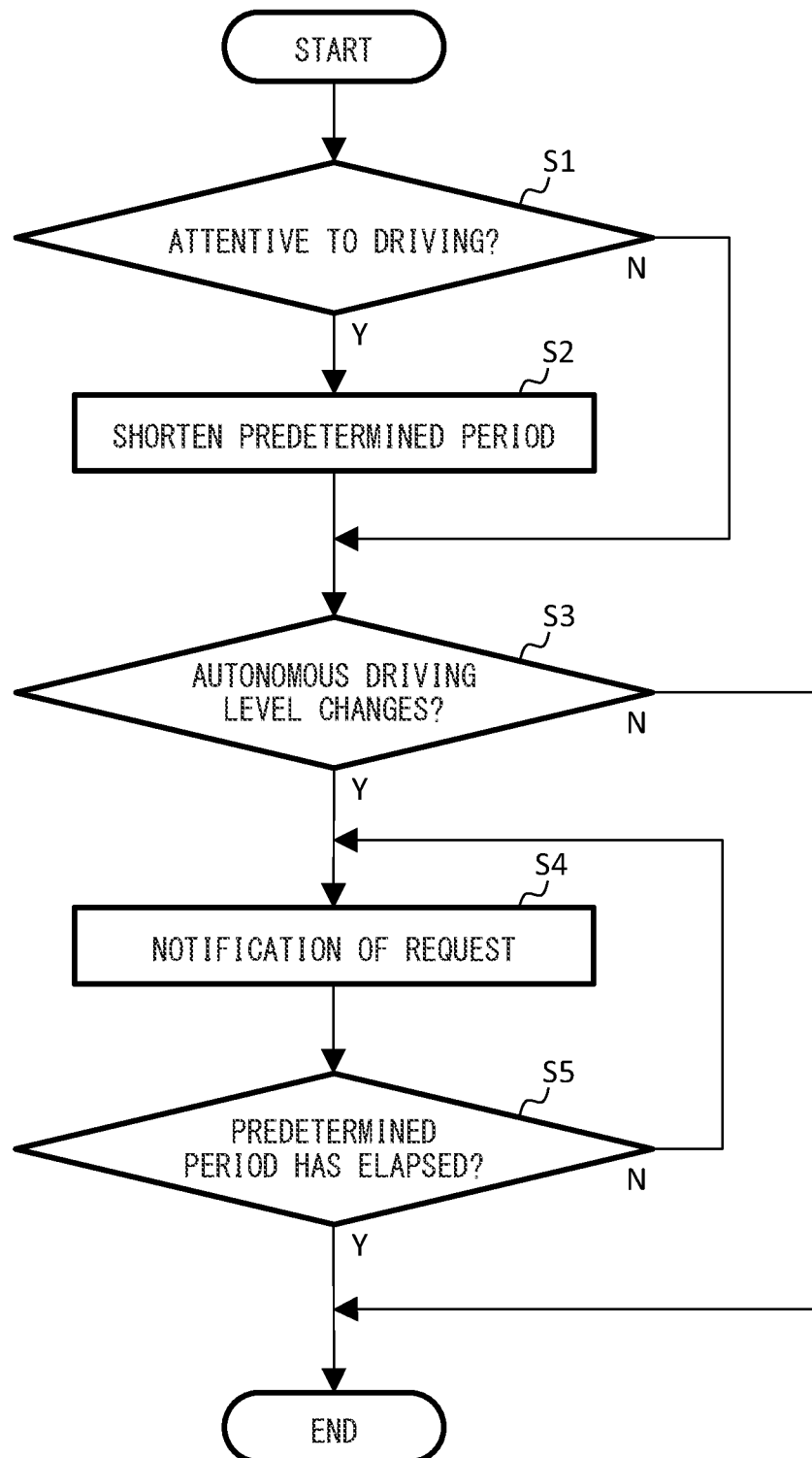

TRAVEL CONTROLLER AND METHOD FOR TRAVEL CONTROL

FIELD

The present disclosure relates to a travel controller and a method for controlling travel of a vehicle.

BACKGROUND

Techniques are disclosed to control travel of a vehicle without requiring driver's watching (autonomous driving level 3). The driver of a vehicle controlled at autonomous driving level 3 is released from driving, and can do secondary activities, such as watching television and using a smartphone.

A change in environment may cause travel control of a vehicle to change from autonomous driving level 3 to, for example, autonomous driving level 2, in which travel of the vehicle is controlled under driver's watching. The driver of a vehicle controlled at autonomous driving level 2 is required to watch the state of driving and to drive the vehicle as necessary.

Japanese Unexamined Patent Publication No. 2019-155956 describes a vehicle control device that requires different operations for finishing autonomous driving according to autonomous driving levels in order to prevent high-level autonomous driving from being finished by erroneous operation of an operation switch for finishing autonomous driving of the current level.

SUMMARY

When travel control of a vehicle changes from autonomous driving that does not require driver's watching to autonomous driving that requires it, it is preferable that a travel controller make a notification for a predetermined period for the purpose of requesting the driver to watch the state of driving or to drive the vehicle. However, such a notification may be annoying for a driver sufficiently paying attention to driving.

It is an object of the present disclosure to provide a travel controller that can request a predetermined response from a vehicle driver at a change of an autonomous driving level so as not to annoy the driver.

A travel controller according to the present disclosure includes a processor configured to perform driving control of a vehicle at an autonomous driving level that is a first autonomous driving level in which a driver of the vehicle is not obligated to watch or a second autonomous driving level in which the driver is obligated to watch; notify, for a predetermined period, the driver of a request for driving the vehicle or taking a driving posture allowing for the driving, when the autonomous driving level of the driving control changes from the first autonomous driving level to the second autonomous driving level; determine an attention level of the driver, based on an output of a sensor provided for the vehicle, the attention level being a level of attention to driving; and modify the predetermined period so as to be shorter when the determined attention level is high than when the determined attention level is low.

The processor of the travel controller according to the present disclosure preferably determines the attention level higher when an output of the sensor is detected than when the output is not detected, the output indicating that the driver is in contact with a steering wheel or a pedal longer than a contact-time threshold, the steering wheel or the pedal being operated by the driver to drive the vehicle.

The processor of the travel controller according to the present disclosure preferably determines the attention level higher when an output of the sensor is detected than when the output is not detected, the output indicating that the driver performs driving operation on a larger scale than an operation threshold.

The processor of the travel controller according to the present disclosure is preferably further configured to detect a looking direction of the driver, based on a face image outputted by the sensor, the face image representing the driver's face and being generated by the sensor, and, in determining, determine the attention level higher when the looking direction is a forward direction than when the looking direction is not a forward direction.

The processor of the travel controller according to the present disclosure preferably determines the attention level higher when an output of the sensor is detected than when the output is not detected, the output indicating that a driver's seat on which the driver sits is set in a state suitable for the driver to take the driving posture.

A method for travel control according to the present disclosure includes performing driving control of a vehicle at an autonomous driving level that is a first autonomous driving level in which a driver of the vehicle is not obligated to watch or a second autonomous driving level in which the driver is obligated to watch; notifying, for a predetermined period, the driver of a request for driving the vehicle or taking a driving posture allowing for the driving, when the autonomous driving level of the driving control changes from the first autonomous driving level to the second autonomous driving level; determining an attention level of the driver, based on an output of a sensor provided for the vehicle, the attention level being a level of attention to driving; and modifying the predetermined period so as to be shorter when the determined attention level is high than when the attention level is low.

The travel controller according to the present disclosure can request a predetermined response from a vehicle driver at a change of an autonomous driving level so as not to annoy the driver.

BRIEF DESCRIPTION OF DRAWINGS

FIG. 5 is a flowchart of a travel control process.

DESCRIPTION OF EMBODIMENTS

Hereinafter, a travel controller that can request a predetermined response from a vehicle driver at a change of an autonomous driving level so as not to annoy the driver will be explained in detail with reference to the accompanying drawings. The travel controller performs driving control of a vehicle at an autonomous driving level that is a first autonomous driving level in which a driver of the vehicle is not obligated to watch or a second autonomous driving level in which the driver is obligated to watch. When the autonomous driving level of the driving control changes from the first autonomous driving level to the second autonomous driving level, the travel controller notifies, for a predetermined period, the driver of a request for driving the vehicle or taking a driving posture allowing for the driving. The travel controller determines the driver's level of attention to driving, based on an output of a sensor provided for the vehicle, and modifies the predetermined period so as to be shorter when the determined attention level is high than when the attention level is low.

Figure 1:
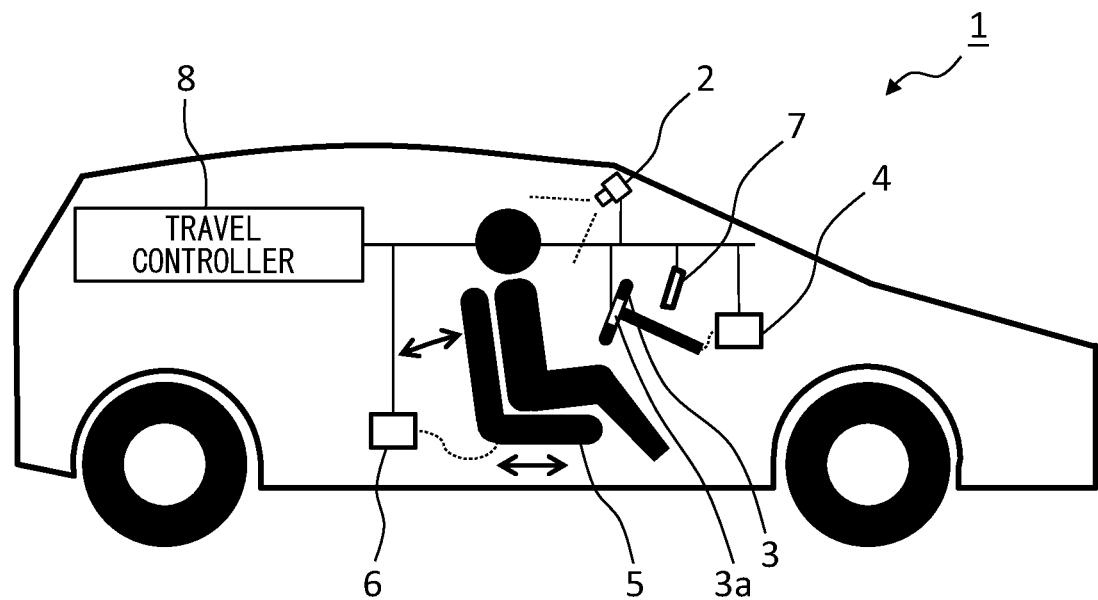
FIG. 1 schematically illustrates the configuration of a vehicle including a travel controller.

FIG. 1 schematically illustrates the configuration of a vehicle including a travel controller.

The vehicle 1 includes a driver monitoring camera 2, a steering wheel 3, a steering controller 4, a driver's seat 5, a seat controller 6, a meter display 7, and a travel controller 8. The driver monitoring camera 2, the steering controller 4, the seat controller 6, and the meter display 7 are connected to the travel controller 8 via an in-vehicle network conforming to a standard, such as a controller area network, so that they can communicate with each other.

The driver monitoring camera 2 is an example of the sensor provided for the vehicle 1, and includes a two-dimensional detector constructed from an array of optoelectronic transducers, such as CCD or C-MOS, having sensitivity to infrared light and a focusing optical system focusing an image of a target region on the two-dimensional detector. The driver monitoring camera 2 also includes a light source that emits infrared light. The driver monitoring camera 2 is mounted, for example, in a front and upper area in the interior of the vehicle and oriented toward the face of the driver sitting on the driver's seat. The driver monitoring camera 2 irradiates the driver with infrared light every predetermined capturing period (e.g. 1/30 to 1/10 seconds), and outputs a face image showing the driver's face.

The steering wheel 3 is an example of an operation unit, and outputs to the steering controller 4 a signal depending on operation by the driver who makes a steering mechanism for steering the vehicle 1 operate. The operation to make the steering mechanism operate is, for example, turning the steering wheel 3 clockwise or counterclockwise. As other operation units, the vehicle 1 includes an accelerator pedal and a brake pedal (not shown).

The steering wheel 3 includes a steering hold sensor 3a. The steering hold sensor 3a is an example of the sensor provided for the vehicle 1, and outputs to the steering controller 4 a steering hold signal depending on whether the driver is holding the steering wheel. The steering hold sensor 3a is, for example, a capacitive sensor provided for the steering wheel 3, and outputs a signal depending on the capacitance in which there is a difference between when the driver is holding and thus in contact with the steering wheel 3 and when not holding and thus not in contact with it.

The steering controller 4 is an electronic control unit (ECU) including a communication interface, a memory, and a processor. The steering controller 4, which is an example of the sensor provided for the vehicle 1, receives a signal depending on driver's operation and a steering hold signal from the steering wheel 3, and transmits them to the travel controller 8.

The driver's seat 5 is a seat on which the driver sits. The driver's seat 5 includes an attitude actuator that changes the attitude of the seat according to a signal outputted by the seat controller 6. The attitude actuator changes, for example, the angle of the backrest and the position of the seat in the back-and-forth direction. The driver's seat 5 can be set in a first state suitable for the driver to take a driving posture (e.g., the backrest is upright, and the distance to the steering wheel 3 is such that the driver can appropriately operate the steering wheel 3). The driver's seat 5 can also be set in a second state unsuitable for the driver to take a driving posture (e.g., the backrest is lowered).

The seat controller 6 is an ECU including a communication interface, a memory, and a processor. The seat controller 6 receives from the travel controller 8 an attitude control signal for changing the attitude of the driver's seat 5, and operates the attitude actuator of the driver's seat 5 in response to the attitude control signal. The seat controller 6 is an example of the sensor provided for the vehicle 1, and transmits to the travel controller 8 a state signal indicating the state of the driver's seat 5 in response to an inquiry from the travel controller 8 or at predetermined intervals (e.g., intervals of 10 seconds).

The meter display 7 is an example of a notifying unit, and includes a display device, such as a liquid crystal display or an organic electroluminescent display. The meter display 7 displays an image, based on an image displaying request, which is received from the travel controller 8, for displaying an image indicating a request asking the driver for a response. For example, the meter display 7 displays an image including a character string, such as "Hold the steering wheel," based on an image displaying command for commanding display of an image requesting the driver to hold the steering wheel. The meter display 7 may display travel-related information, such as a travel speed, a travel distance, and various warnings.

Instead of or in addition to the meter display 7, the vehicle 1 may include a speaker (not shown) as a notifying unit. The speaker outputs a predetermined voice, based on a voice outputting command, which is received from the travel controller 8, for commanding output of a voice indicating a request asking the driver for a response.

The travel controller 8 is an ECU including a communication interface, a memory, and a processor. The travel controller 8 performs driving control of the vehicle 1 at a predetermined autonomous driving level, and requests a predetermined response from the driver via the meter display 7 at a change of the autonomous driving level.

Figure 2:
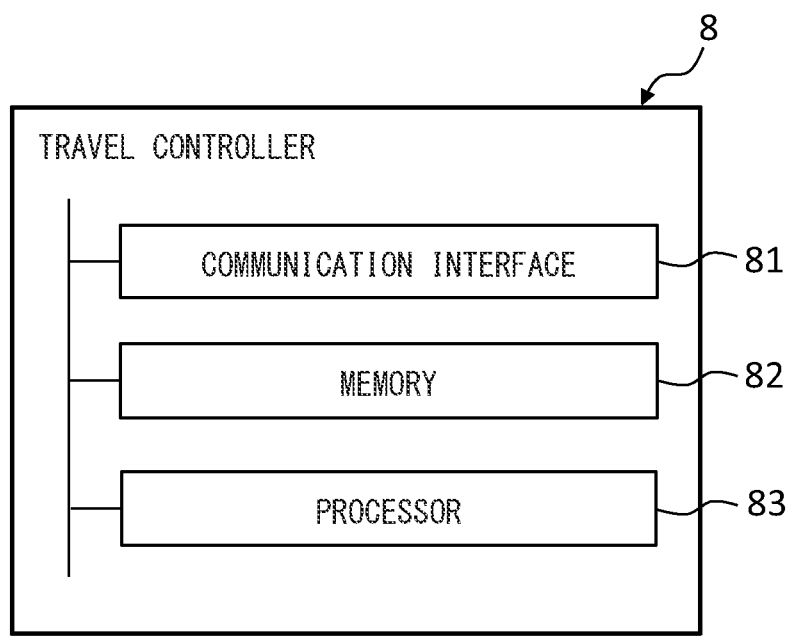
FIG. 2 schematically illustrates the hardware of the travel controller.

FIG. 2 schematically illustrates the hardware of the travel controller 8. The travel controller 8 includes a communication interface 81, a memory 82, and a processor 83.

The communication interface 81 is an example of a communication unit, and includes a communication interface circuit for connecting the travel controller 8 to the in-vehicle network. The communication interface 81 provides received data for the processor 83, and outputs data provided from the processor 83 to an external device.

The memory 82 includes volatile and nonvolatile semiconductor memories. The memory 82 stores various types of data used for processing by the processor 83, e.g., image-displaying-request data for outputting an image displaying request, voice-outputting-request data for outputting a voice outputting request, an attention-level table in which values outputted from sensors are associated with attention levels, and an attention threshold for determining whether to shorten the predetermined period, based on the driver's level of attention to driving. The memory 82 also stores various application programs, such as a travel control program for executing a travel control process.

The processor 83 is an example of a control unit, and includes one or more processors and a peripheral circuit thereof. The processor 83 may further include another operating circuit, such as a logic-arithmetic unit, an arithmetic unit, or a graphics processing unit.

Figure 3:
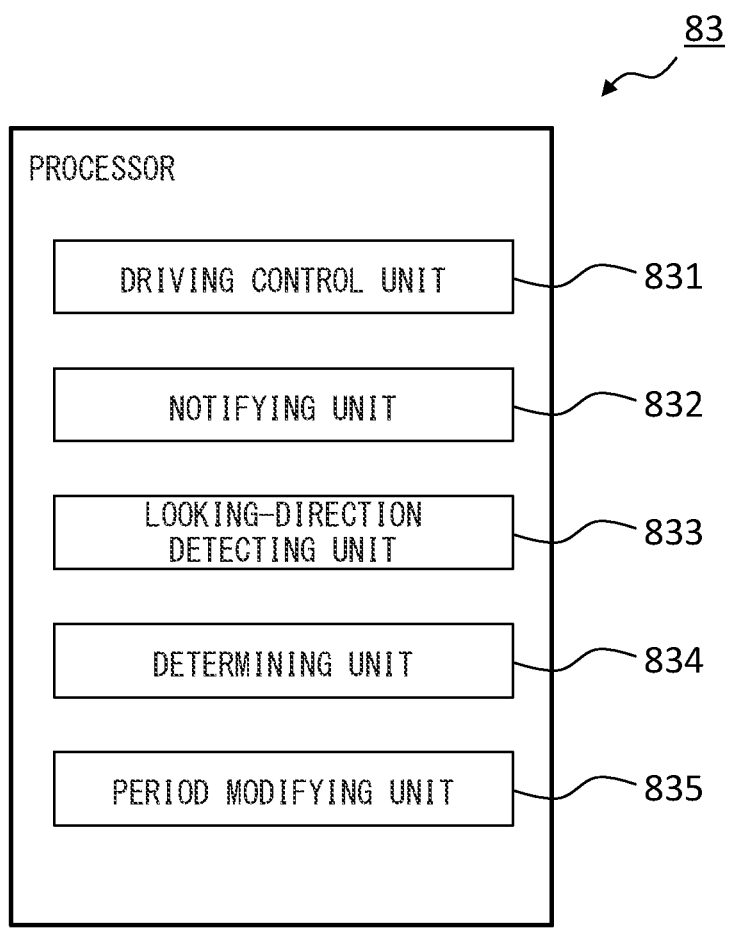
FIG. 3 is a functional block diagram of a processor included in the travel controller.

FIG. 3 is a functional block diagram of the processor 83 included in the travel controller 8.

As its functional blocks, the processor 83 of the travel controller 8 includes a driving control unit 831, a notifying unit 832, a looking-direction detecting unit 833, a determining unit 834, and a period modifying unit 835. These units included in the processor 83 are functional modules implemented by a program executed on the processor 83, or may be implemented in the travel controller 8 as separate integrated circuits, microprocessors, or firmware.

The driving control unit 831 performs driving control of the vehicle 1 at an autonomous driving level that is a first autonomous driving level in which the driver of the vehicle 1 is not obligated to watch or a second autonomous driving level in which the driver is obligated to watch.

The driving control unit 831 receives via the communication interface 81 a surrounding image generated by a camera (not shown) mounted on the vehicle 1 to detect the situation around the vehicle 1. The driving control unit 831 then inputs the received surrounding image into a classifier that has been trained to detect lane lines, thereby detecting lane lines around the vehicle 1. The driving control unit 831 also inputs the received surrounding image into a classifier that has been trained to detect vehicles, thereby detecting other vehicles near the vehicle 1.

The classifier may be, for example, a convolution neural network (CNN) including multiple layers connected in series from the input toward the output. A CNN that has been trained using, as training data, inputted images including lane lines or other vehicles operates as a classifier to detect lane lines or other vehicles from the image.

For example, when it performs driving control of the vehicle 1 at the first autonomous driving level, the driving control unit 831 outputs a control signal to a travel mechanism (not shown) of the vehicle 1 via the communication interface 81 so that the vehicle 1 will appropriately travel along a lane, based on the detected lane lines, and that the distance to a detected vehicle will be longer than a predetermined distance. The travel mechanism includes, for example, an engine for supplying motive power to the vehicle 1, a brake for decreasing the travel speed of the vehicle 1, and the steering mechanism for steering the vehicle 1.

For example, when it performs driving control of the vehicle 1 at the second autonomous driving level, the driving control unit 831 outputs a control signal to the travel mechanism (not shown) of the vehicle 1 via the communication interface 81 so that the vehicle 1 will appropriately travel along a lane, based on the detected lane lines.

The notifying unit 832 notifies, for a predetermined period (e.g., 1 minute), the driver of a request for a predetermined response, when the autonomous driving level of the driving control changes from the first autonomous driving level to the second autonomous driving level. The predetermined response is an action required of the driver of the vehicle 1 whose driving is controlled at the second autonomous driving level, e.g., driving the vehicle 1 and taking a driving posture allowing for the driving.

For example, the notifying unit 832 transmits to the meter display 7 an image displaying command for commanding display of an image requesting holding the steering wheel 3. The notifying unit 832 may output to the speaker a voice outputting command for commanding output of a voice requesting operating the steering wheel. The notifying unit 832 may request operating an operation unit (e.g., the accelerator pedal) other than the steering wheel 3. The notifying unit 832 may make a notification of a request for an angle adjustment to adjust the orientation of a rearview mirror for checking the situation behind the vehicle 1 to an angle such that vehicles behind can be seen.

The looking-direction detecting unit 833 detects the looking direction of the driver, based on a face image outputted by the driver monitoring camera 2. The looking direction is expressed as an angle, in a horizontal or vertical plane, between the travel direction of the vehicle 1 and the direction in which the driver is looking.

The looking-direction detecting unit 833 inputs the obtained face image into a classifier that has been trained to detect the positions of pupils and images of a light source reflected on corneas, thereby identifying the positions of the pupils and images reflected on the corneas in the driver's eyes in the face image. The looking-direction detecting unit 833 then detects the looking direction, based on the positional relationship between the pupils and the images reflected on the corneas.

The classifier may be, for example, a CNN. A CNN that has been trained using, as training data, inputted face images including pupils and images reflected on corneas operates as a classifier to identify the positions of pupils and images reflected on corneas.

The determining unit 834 determines the driver's level of attention to driving, based on an output of a sensor provided for the vehicle 1.

The attention level is a value indicating to what extent the driver is paying attention to driving. The higher the attention level, the higher the possibility of smooth takeover of driving from autonomous driving. As the attention level, the determining unit 834 determines a value associated with an output of a sensor in the attention-level table stored in the memory 82. The determining unit 834 may determine a representative value, such as the sum or average of values respectively associated with outputs of multiple sensors, as the attention level.

The period modifying unit 835 modifies the predetermined period, during which the notifying unit 832 requests a predetermined response, so as to be shorter when the attention level determined by the determining unit 834 is high than when the attention level is low. For example, the period modifying unit 835 modifies the predetermined period, during which the notifying unit 832 requests a predetermined response, so as to be shorter when the attention level determined by the determining unit 834 exceeds the attention threshold stored in the memory 82 than when the attention level does not exceed the attention threshold. The period modifying unit 835 may set the predetermined period corresponding to the determined attention level by referring to the memory 82 storing attention levels and predetermined periods corresponding thereto in association with each other. In this case, the memory 82 stores associations such that the higher the attention level, the shorter the predetermined period corresponding thereto.

When the determining unit 834 determines the attention level that is "1 (attentive)" or "0 (inattentive)," the attention threshold is set to a value greater than 0 and less than 1, such as 0.5. The period modifying unit 835 modifies the predetermined period so as to be shorter when the result of determination is attentive than when that is inattentive.

The period modifying unit 835 sets the predetermined period for the case that the attention level does not exceed the attention threshold as a standard, and shortens the predetermined period when the attention level exceeds the attention threshold. Alternatively, the period modifying unit 835 may set the predetermined period for the case that the attention level exceeds the attention threshold as a standard, and extend the predetermined period when the attention level does not exceed the attention threshold. Alternatively, the period modifying unit 835 may extend the length by which the predetermined period is shortened when the attention level exceeds the attention threshold, compared to the length by which it is shortened when the attention level does not exceed the attention threshold. Alternatively, the period modifying unit 835 may shorten the length by which the predetermined period is extended when the attention level exceeds the attention threshold, compared to the length by which it is extended when the attention level does not exceed the attention threshold.

In the present embodiment, the determining unit 834 receives, for example, a signal depending on a steering hold signal outputted by the steering hold sensor 3a of the steering wheel 3, from the steering controller 4 via the communication interface 81. When the signal depending on a steering hold signal has been received longer than a predetermined contact-time threshold (e.g., 3 seconds), the determining unit 834 determines the attention level higher than when the signal depending on a steering hold signal has not been received longer than the contact-time threshold.

In the present embodiment, the determining unit 834 may receive a signal indicating the intensity of torque applied to the steering wheel 3 by driver's operation from the steering controller 4 via the communication interface 81. When a signal indicating torque not less than a torque existence threshold (e.g., 1.0 Nm) stored in the memory 82 has been received for a predetermined period (e.g., 3 seconds), the determining unit 834 determines the attention level higher than when a signal indicating torque not less than the torque existence threshold has not been received for the predetermined period. The torque existence threshold is an example of the operation threshold.

In the present embodiment, the determining unit 834 may receive a signal indicating a rotation angle of the steering wheel 3 operated by the driver from the steering controller 4 via the communication interface 81. For example, when signals indicating clockwise and counterclockwise rotation angles of the steering wheel 3 are alternately received more than a reversal frequency threshold (e.g., 4 times) in a predetermined period (e.g., 1 minute), the determining unit 834 determines the attention level higher than when signals indicating such rotation angles are not received more than the reversal frequency threshold in the predetermined period. The reversal frequency threshold is an example of the operation threshold.

In the present embodiment, when the looking direction of the driver detected by the looking-direction detecting unit 833 is the forward direction, the determining unit 834 may determine the attention level higher than when the looking direction of the driver is not the forward direction.

In the present embodiment, when the degree of sleepiness is higher than a predetermined sleepiness threshold, the determining unit 834 may determine the attention level lower than when that of sleepiness is lower than the sleepiness threshold. The degree of sleepiness is calculated based on, for example, the moving speed of the line of sight, the period of blinks, and the degree of opening of the mouth, which are detected from a face image received from the driver monitoring camera 2.

In the present embodiment, the determining unit 834 may receive a state signal indicating the state of the driver's seat 5 from the seat controller 6 via the communication interface 81. When a state signal indicating that the driver's seat 5 is set in the first state suitable for the driver to take a driving posture is received, the determining unit 834 determines the attention level higher than when the state signal indicating setting in the first state is not received.

Figure 4:
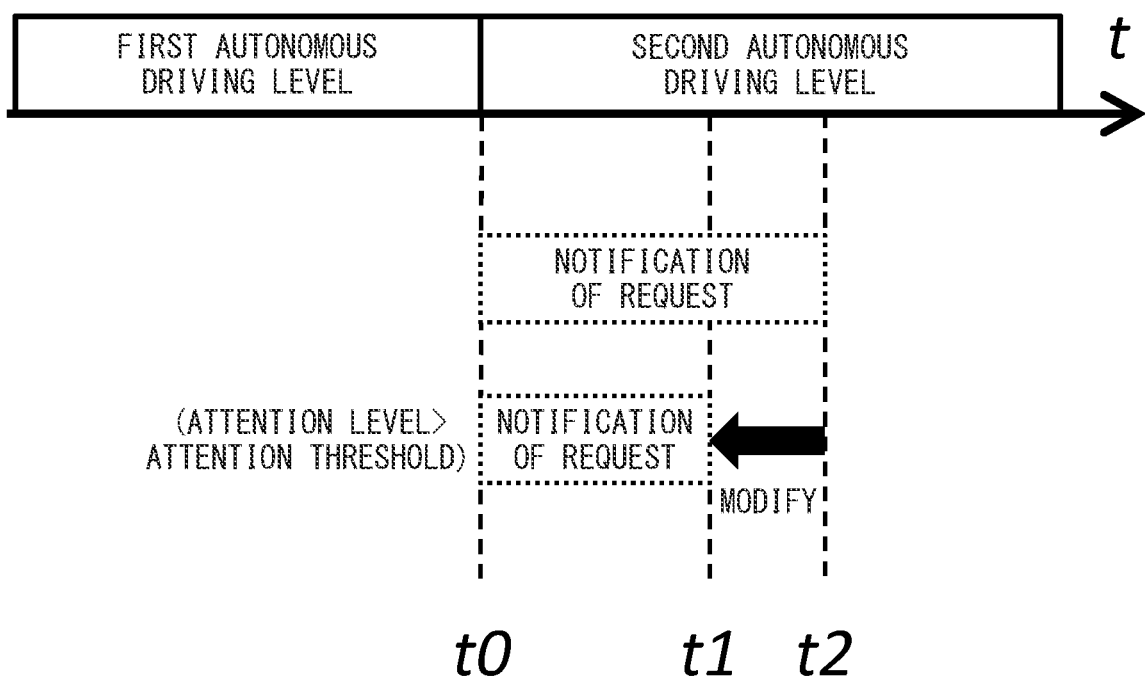
FIG. 4 is a diagram for explaining modification of a predetermined period.

FIG. 4 is a diagram for explaining modification of the predetermined period.

The autonomous driving level of driving control performed by the driving control unit 831 changes from the first autonomous driving level to the second autonomous driving level at time t0. The notifying unit 832 notifies the driver of a request for a predetermined response for a predetermined period from time t0 to time t2. In the example of FIG. 4, the period modifying unit 835 shortens the predetermined period for the case that the attention level determined by the determining unit 834 exceeds the attention threshold, and notifies the driver of a request for a predetermined response for a predetermined period from time t0 to time t1, which is earlier than time t2.

FIG. 5 is a flowchart of a travel control process. The processor 83 of the travel controller 8 repeats the travel control process at predetermined intervals during travel of the vehicle 1.

First, the determining unit 834 determines whether the driver's level of attention to driving exceeds the attention threshold, based on an output of a sensor provided for the vehicle 1 (step S1).

When it is determined that the attention level exceeds the attention threshold (Yes in step S1), the period modifying unit 835 shortens the predetermined period, compared to when it is determined that the attention level does not exceed the attention threshold (step S2), and the process of the processor 83 proceeds to next step S3. When it is determined that the attention level does not exceed the attention threshold (No in step S1), the process of the processor 83 proceeds to next step S3.

Next, the notifying unit 832 determines whether the autonomous driving level of driving control performed by the driving control unit 831 changes from the first autonomous driving level to the second autonomous driving level (step S3).

When it is determined that the autonomous driving level changes from the first autonomous driving level to the second autonomous driving level (Yes in step S3), the notifying unit 832 notifies the driver of a request for a predetermined response (step S4). Then, the notifying unit 832 determines whether a predetermined period has elapsed since the start of the notification of request (step S5). When it is determined that a predetermined period has not elapsed (No in step S5), the notifying unit 832 continues the notification of request by returning to step S4. When it is determined that a predetermined period has elapsed (Yes in step S5), the processor 83 terminates the travel control process.

When it is not determined that the autonomous driving level changes from the first autonomous driving level to the second autonomous driving level (No in step S3), the processor 83 terminates the travel control process.

The travel control process executed in this way enables requesting a predetermined response from a vehicle driver at a change of an autonomous driving level so as not to annoy the driver.

According to a modified example, the period modifying unit 835 modifies the predetermined period in three ways or more, depending on the determined attention level. For example, in the case that the attention level is determined based on the intensity of torque applied to the steering wheel 3, the period modifying unit 835 may execute a process to further shorten the predetermined period when a signal indicating torque not less than a torque intensity threshold (e.g., 2.0 Nm), which is greater than the torque existence threshold, is received. When a signal indicating torque not less than the torque intensity threshold is received, the period modifying unit 835 modifies the predetermined period to a period from the start of requesting a predetermined response to the current time. This enables the request for a predetermined response to be immediately finished when a signal indicating torque not less than the torque intensity threshold is received.

According to another modified example, the determining unit 834 determines the attention level, based on a combination of outputs of multiple sensors provided for the vehicle 1. For example, the determining unit 834 receives a steering hold signal from the steering controller 4, and obtains the looking direction detected based on a face image outputted by the driver monitoring camera 2. When a steering hold signal has been received longer than the contact-time threshold and the looking direction is the forward direction, the determining unit 834 determines the attention level higher than when only one of these conditions are satisfied.

According to yet another modified example, the period modifying unit 835 shortens the predetermined period on condition that an output of one of the sensors mounted on the vehicle 1 satisfies a predetermined condition. For example, the period modifying unit 835 may shorten the predetermined period on condition that a state signal of the driver's seat 5 received from the seat controller 6 indicates the first state suitable for the driver to take a driving posture. In other words, in the case that the state signal of the driver's seat 5 indicates the second state unsuitable to take a driving posture, the period modifying unit 835 does not shorten the predetermined period even if, for example, a steering hold signal has been received longer than the contact-time threshold. The period modifying unit 835 may shorten the predetermined period on condition that the degree of sleepiness calculated from a face image is lower than the predetermined sleepiness threshold.

Note that those skilled in the art can apply various changes, substitutions, and modifications without departing from the spirit and scope of the present disclosure.

What is claimed is:

1. A travel controller comprising a processor configured to:
   perform driving control of a vehicle at an autonomous driving level that is a first autonomous driving level in which a driver of the vehicle is not obligated to watch or a second autonomous driving level in which the driver is obligated to watch;
   notify, for a predetermined period, the driver of a request for driving the vehicle or taking a driving posture allowing for the driving, when the autonomous driving level of the driving control changes from the first autonomous driving level to the second autonomous driving level;
   determine an attention level of the driver, based on an output of a sensor provided for the vehicle, the attention level being a level of attention to driving; and
   modify the predetermined period so as to be shorter by keeping a start time of the predetermined period unchanged and modifying an end time of the predetermined time period to be earlier, when the determined attention level is high than when the determined attention level is low.

2. The travel controller according to claim 1, wherein the processor determines the attention level higher when an output of the sensor is detected than when the output is not detected, the output indicating that the driver is in contact with a steering wheel or a pedal longer than a contact-time threshold, the steering wheel or the pedal being operated by the driver to drive the vehicle.

3. The travel controller according to claim 1, wherein the processor determines the attention level higher when an output of the sensor is detected than when the output is not detected, the output indicating that the driver performs driving operation on a larger scale than an operation threshold.

4. The travel controller according to claim 1, wherein the processor is further configured to
   detect a looking direction of the driver, based on a face image outputted by the sensor, the face image representing the driver's face and being generated by the sensor, and,
   in determining, determine the attention level higher when the looking direction is a forward direction than when the looking direction is not a forward direction.

5. The travel controller according to claim 1, wherein the processor determines the attention level higher when an output of the sensor is detected than when the output is not detected, the output indicating that a driver's seat on which the driver sits is set in a state suitable for the driver to take the driving posture.

6. A method for travel control, comprising:
   performing driving control of a vehicle at an autonomous driving level that is a first autonomous driving level in which a driver of the vehicle is not obligated to watch or a second autonomous driving level in which the driver is obligated to watch;
   notifying, for a predetermined period, the driver of a request for driving the vehicle or taking a driving posture allowing for the driving, when the autonomous driving level of the driving control changes from the first autonomous driving level to the second autonomous driving level;
   determining an attention level of the driver, based on an output of a sensor provided for the vehicle, the attention level being a level of attention to driving; and
   modifying the predetermined period so as to be shorter by keeping a start time of the predetermined period unchanged and modifying an end time of the predetermined time period to be earlier, when the determined attention level is high than when the attention level is low.

7. The method for travel control according to claim 6, wherein the attention level higher is determined to be higher when an output of the sensor is detected than when the output is not detected, the output indicating that the driver is in contact with a steering wheel or a pedal longer than a contact-time threshold, the steering wheel or the pedal being operated by the driver to drive the vehicle.

8. The method for travel control according to claim 6, wherein the attention level is determined to be higher when an output of the sensor is detected than when the output is not detected, the output indicating that the driver performs driving operation on a larger scale than an operation threshold.

9. The method for travel control according to claim 6, further comprising:
   detect a looking direction of the driver, based on a face image outputted by the sensor, the face image representing the driver's face and being generated by the sensor, and, in determining, determine the attention level higher when the looking direction is a forward direction than when the looking direction is not a forward direction.

10. The method for travel control according to claim 6, wherein the attention level is determined to be higher when an output of the sensor is detected than when the output is not detected, the output indicating that a driver's seat on which the driver sits is set in a state suitable for the driver to take the driving posture.

* * * * *